United States Patent
Cho et al.

(10) Patent No.: US 12,447,832 B2
(45) Date of Patent: Oct. 21, 2025

(54) LAUNCH CONTROL SYSTEM AND METHOD FOR AN ELECTRIC VEHICLE

(71) Applicants: HYUNDAI MOTOR COMPANY, Seoul (KR); KIA CORPORATION, Seoul (KR)

(72) Inventors: Sung Hyun Cho, Yongin-si (KR); Soo Han Song, Seoul (KR); Seong Hwan Cheong, Suwon-si (KR); Joseph D Chang, Suwon-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 15 days.

(21) Appl. No.: 18/636,938

(22) Filed: Apr. 16, 2024

(65) Prior Publication Data

US 2025/0058649 A1 Feb. 20, 2025

(30) Foreign Application Priority Data

Aug. 14, 2023 (KR) .................. 10-2023-0106059
Nov. 13, 2023 (KR) .................. 10-2023-0156001

(51) Int. Cl.
| | |
|---|---|
| *B60L 15/20* | (2006.01) |
| *B60K 35/21* | (2024.01) |
| *B60K 35/28* | (2024.01) |
| *B60W 10/08* | (2006.01) |
| *B60W 20/30* | (2016.01) |

(Continued)

(52) U.S. Cl.
CPC .......... *B60L 15/2072* (2013.01); *B60K 35/21* (2024.01); *B60W 10/08* (2013.01); *B60W 20/30* (2013.01); *B60W 30/18027* (2013.01); *B60K 2360/172* (2024.01); *B60L 2240/24* (2013.01); *B60L 2240/423* (2013.01); *B60L 2250/26* (2013.01); *B60W 20/15* (2016.01); *B60W 20/19* (2016.01)

(58) Field of Classification Search
CPC ........ B60K 35/21; B60K 35/22; B60K 35/28; B60K 2360/1438; B60K 2360/161; B60K 2360/171; B60K 2360/172; B60L 15/2072; B60L 15/38; B60L 2240/12; B60L 2240/16; B60L 2240/24; B60L 2240/423; B60L 2240/425; B60L 2250/26; B60W 10/08; B60W 20/15; B60W 20/19; B60W 20/20; B60W 20/30; B60W 30/18027; B60W 30/02–2030/206
See application file for complete search history.

(56) References Cited

U.S. PATENT DOCUMENTS

| | | | | |
|---|---|---|---|---|
| 8,175,785 B2 * | 5/2012 | Turski | ............ | B60W 30/18027 701/84 |
| 2020/0189593 A1 * | 6/2020 | Wishin | .................. | B60W 10/11 |

FOREIGN PATENT DOCUMENTS

| | | | | | |
|---|---|---|---|---|---|
| CN | 107985312 A | * | 5/2018 | ...... | B60W 30/18009 |
| EP | 2789514 B1 | * | 8/2021 | ............ | B60W 10/08 |

* cited by examiner

*Primary Examiner* — Tinh Dang
(74) *Attorney, Agent, or Firm* — Lempia Summerfield Katz LLC (57) ABSTRACT

A launch control system and method for an electric vehicle, which are capable of satisfying a driver's demand for a high-performance vehicle by realizing the high performance of the electric vehicle. The system and method maximize acceleration at an initial stage of launching the electric vehicle from a standstill, thereby shortening the time to reach the maximum acceleration when launching the electric vehicle from the standstill.

20 Claims, 7 Drawing Sheets

(51) Int. Cl.
*B60W 30/18* (2012.01)
*B60W 20/15* (2016.01)
*B60W 20/19* (2016.01)

LAUNCH CONTROL SYSTEM AND METHOD FOR AN ELECTRIC VEHICLE

CROSS-REFERENCE TO RELATED APPLICATION

This application claims the benefit of and priority to Korean Patent Application No. 10-2023-0156001, filed on Nov. 13, 2023, and Korean Provisional Application No. 10-2023-0106059, filed on Aug. 14, 2023, the entire contents of each of which are incorporated herein by reference.

BACKGROUND

(a) Technical Field

The present disclosure relates to a launch control system and method for an electric vehicle. More particularly, the present disclosure relates to a launch control system and method for an electric vehicle capable of satisfying the needs of a high-performance vehicle by controlling maximum launch performance in a state in which the vehicle is stopped.

(b) Background Art

Recently, continuous research, development, and release of eco-friendly vehicles such as hybrid electric vehicles, fuel cell electric vehicles, and electric vehicles have been conducted.

Figure 1:
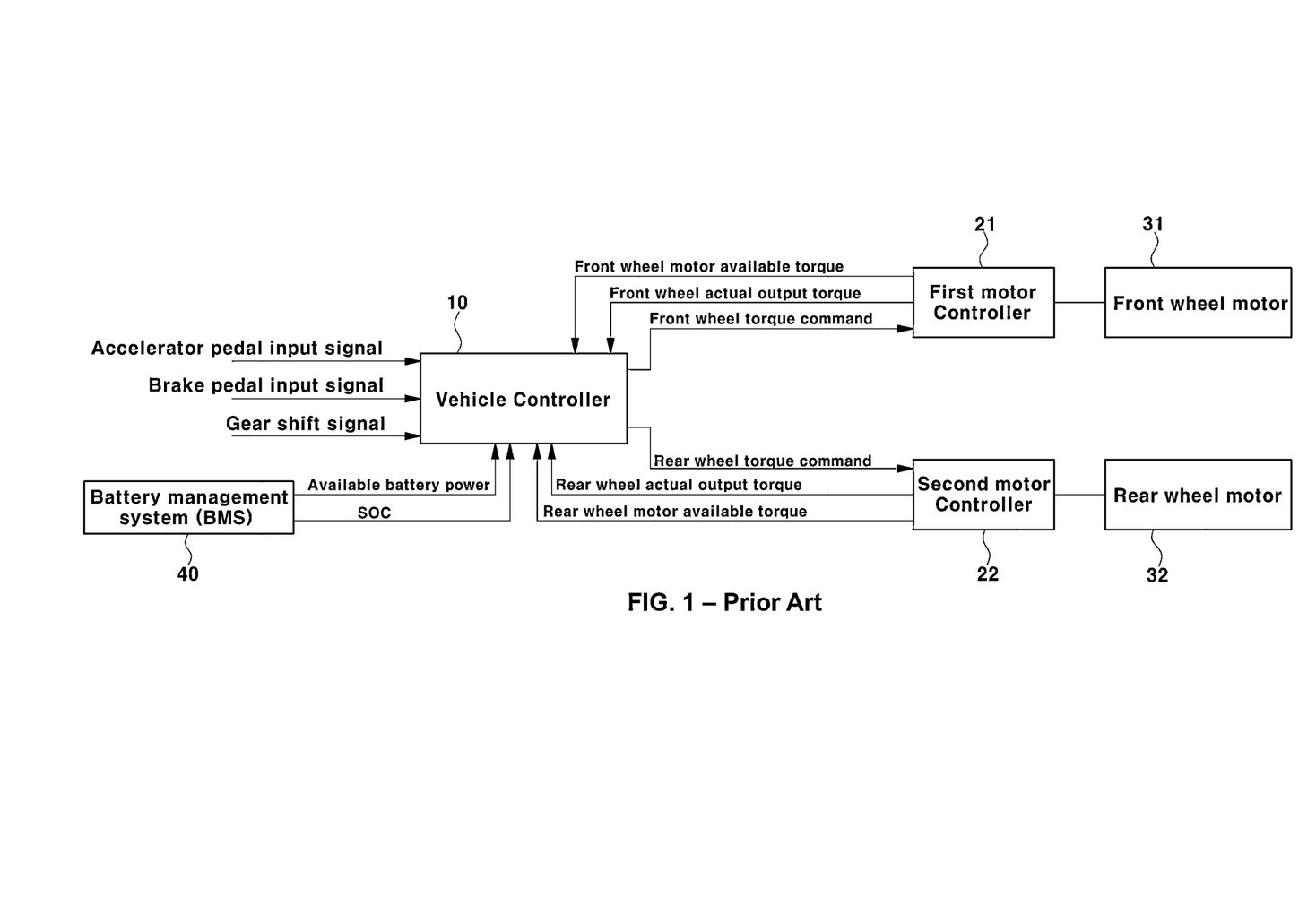
FIG. 1 is diagram showing a control configuration for motor driving of a conventional electric vehicle.

FIG. 1 is a diagram showing a control configuration for driving a motor of a conventional electric vehicle.

As shown in FIG. 1, a front wheel motor 31 that outputs driving torque to the front wheels and a rear wheel motor 32 that outputs driving torque to the rear wheels may be mounted in an electric vehicle.

In addition, the torque of the front wheel motor 31 is controlled by a first motor controller 21 (MCU), which is a type of motor control inverter. The torque of the rear wheel motor 32 is controlled by a second motor controller 22, which is a type of motor control inverter.

To this end, a vehicle controller 10 is connected to the first motor controller 21 and the second motor controller 22 to enable torque command. Additionally, the vehicle controller 10 is connected to a battery management system 40 to enable electrical signal transmission.

As information for determining a torque command value, a front wheel actual output torque, and a front wheel motor available torque transmitted from the first motor controller 21 are input to the vehicle controller 10, a rear wheel actual output torque and a rear wheel motor available torque transmitted from the second motor controller 22 are input to the vehicle controller 10. Additionally, an available battery power and a current battery charge (SoC, State of Charge) transmitted from the battery management system 40 are input to the vehicle controller 10.

Further, the information for determining the torque command value, an accelerator pedal input signal, a brake pedal input signal, a shift gear input signal, and the like are input to the vehicle controller 10.

Accordingly, when the accelerator pedal input signal, the brake pedal input signal, and the shift gear input signal are input to the vehicle controller 10, the vehicle controller 10 determines a front wheel motor torque command value and a rear wheel motor torque command value. This determination is based on the front wheel actual output torque and the front wheel motor available torque transmitted from the first motor controller 21, the rear wheel actual output torque and the rear wheel motor available torque transmitted from the second motor controller 22, and the available battery power and the current battery charge transmitted from the battery control system 40.

Subsequently, the vehicle controller 10 transmits the front wheel motor torque command value and the rear wheel motor torque command value to the first motor controller 21 and the second motor controller 22, respectively. As a result, the front wheel motor 31 may be operated by torque control according to the front wheel motor torque command value of the first motor controller 21, and the rear wheel motor 32 may be operated by torque control according to the rear wheel motor torque command value of the second motor controller 22.

When an electric vehicle is driven through the above-described motor control, the motor torque may be output as the maximum torque from the start of launch when the vehicle is at a standstill, and instantaneous acceleration may be achieved by the maximum torque output of the motor. A separate launch device or a launch control system used in a general internal combustion engine vehicle is not employed.

In other words, in the case of the electric vehicle, since the acceleration due to the output of the maximum torque of the motor in an initial launch from a standstill is faster than that of the general internal combustion engine vehicle, there is not much demand for a drive mode for achieving rapid acceleration through the launch control used in the general internal combustion engine vehicle.

However, regarding a high-performance electric vehicle, considering that acceleration performance from 0 to 100 kph is emphasized in drag racing, the techniques and capabilities that maximize acceleration during launching are recognized as indicators of high performance. Ongoing research and development efforts aim to reduce the time required for electric vehicles to reach their maximum acceleration.

The above information disclosed in this Background section is only to enhance the understanding of the background of the present disclosure. Therefore, the Background section may contain information that does not form the prior art that is already known to a person of ordinary skill in the art.

SUMMARY

The present disclosure has been made in an effort to solve the above-described problems associated with the prior art. An object of the present disclosure is to provide a launch control system and method for an electric vehicle, capable of satisfying the driver's demand for the needs of a high-performance vehicle. This is achieved by shortening the time to reach the maximum acceleration at an initial stage of launching an electric vehicle from a standstill. As a result, a high-performance electric vehicle and maximum acceleration of the electric vehicle are achieved.

In one aspect, the present disclosure provides a launch control system for an electric vehicle including an audio, video, and navigation (AVN) system configured to select a road grip level and launch control activation, and an accelerator pedal detector configured to detect a depression amount of an accelerator pedal. The launch control system further includes a brake pedal detector configured to detect a depression amount of a brake pedal, and a vehicle controller configured to, based on a launch control activation signal from the AVN system, a detection signal of the accelerator pedal detector, and a detection signal of the brake pedal detector, execute a first-stage launch control when first-stage launch control entry conditions are satisfied. The vehicle controller is further configured to execute a second-stage launch control of applying pre-motor torque to a motor when second-stage launch control conditions are satisfied in a state in which the first-stage launch control is executed, and execute a third-stage boost control mode when the brake pedal is released in a state in which the second-stage launch control is executed.

In an embodiment, the vehicle controller may be configured to execute the first-stage launch control when all the first-stage launch control entry conditions are satisfied. The first-stage launch control entry conditions include conditions that a current drive mode of a vehicle may not be in a boost mode or a cruise mode, a temperature of a motor controller may be equal to or less than a certain temperature, a temperature of an insulated gate bipolar transistor (IGBT) of the motor may be equal to or less than a certain temperature, and a cooldown time may be longer than a reference time.

In another embodiment, the vehicle controller may be configured to execute the second-stage launch control when all the second-stage launch control entry conditions are satisfied. The second-stage launch control entry conditions include conditions that a drive mode may be selected as a sport mode or a sport+ mode, electronic stability control (ESC) may be turned off, a gear shift may be set to drive (D), a steering angle of a steering wheel may be less than a certain angle, and an accelerator pedal stroke may exceed a certain level at the same time a brake pedal stroke may exceed a certain level.

In still another embodiment, the vehicle controller may be configured to determine, as the pre-motor torque to be applied to the motor in advance, a larger torque value among a motor torque determined from a motor torque application map according to the road grip level and a motor torque determined from a motor torque application map in a state in which the accelerator pedal and the brake pedal are pressed at the same time.

In yet another embodiment, when the pre-motor torque determined by the vehicle controller is transmitted to the motor controller, the pre-motor torque may be applied to the motor by torque control of the motor controller.

In still yet another embodiment, the launch control system may further include a cluster that is configured to display guidance information for launch control execution based on launch control state information received from the vehicle controller.

In a further embodiment, the vehicle controller may be configured to determine a virtual engine speed when executing the second-stage launch control and transmit the determined virtual engine speed to a sound controller.

In another further embodiment, the sound controller may be configured to determine a virtual engine sound volume according to the virtual engine speed and output the determined virtual engine sound volume through a speaker.

In still another further embodiment, the vehicle controller may be configured to perform a control for executing the first-stage launch control again when any of the second-stage launch control entry conditions are not satisfied when the second-stage launch control for applying the pre-motor torque is executed.

In yet another further embodiment, the vehicle controller may be configured to forcibly release the launch control when a time for executing the second-stage launch control for applying the pre-motor torque exceeds a reference time.

In still yet another further embodiment, the vehicle controller may be configured to execute a third-stage boost control mode when confirmation is made that the brake pedal is released within a reference time when the second-stage launch control for applying the pre-motor torque is executed.

In a still further embodiment, the vehicle controller may be configured to measure a cooldown time when the third-stage boost control mode ends.

In another aspect, the present disclosure provides a launch control method for an electric vehicle. The launch control method includes: determining, by a vehicle controller, whether a road grip level is selected; determining, by the vehicle controller, whether launch control activation is selected and whether first-stage launch control entry conditions are satisfied; and executing, by the vehicle controller, a first-stage launch control when the road grip level and the launch control activation are selected and the first-stage launch control entry conditions are satisfied. The launch control method further includes: executing, by the vehicle controller, a second-stage launch control for applying pre-motor torque to the motor when second-stage launch control entry conditions are satisfied in a state in which the first-stage launch control is executed; and executing, by the vehicle controller, a third-stage boost control mode when it is confirmed that a brake pedal is released when the second-stage launch control is executed.

In an embodiment, executing the second-stage launch control may include determining, by the vehicle controller, as the pre-motor torque, a larger torque value among a motor torque determined from a motor torque application map according to the road grip level and a motor torque determined from a motor torque application map in a state in which the accelerator pedal and the brake pedal are pressed at the same time. The executing the second-stage launch control may further include: transmitting, by the vehicle controller, the determined pre-motor torque to a motor controller; and applying, by torque control of the motor controller, the pre-motor torque to the motor.

In another embodiment, the launch control method may further include displaying, by a cluster, guidance information for executing launch control based on launch control state information received from the vehicle controller.

In still another embodiment, the launch control method may further include: determining, by the vehicle controller, when the second-stage launch control is executed, a virtual engine speed; and transmitting, by the vehicle controller, the virtual engine speed to the sound controller. The launch control method may further include: determining, by the sound controller, a virtual engine sound volume according to the virtual engine speed; and outputting, by a speaker, the determined virtual engine sound volume.

In yet another embodiment, the third-stage boost control mode may be executed when it is confirmed that the brake pedal is released within a reference time when the second-stage launch control for applying the pre-motor torque is executed.

In still yet another embodiment, the launch control method may further include performing, by the vehicle controller, control for executing the first-stage launch control again when any of the second-stage launch control entry conditions are not satisfied in a state in which the second-stage launch control for applying the pre-motor torque is executed. The launch control method may further include: forcibly releasing, by the vehicle controller, the second-stage launch control when a time for executing the second-stage launch control for applying the pre-motor torque exceeds a reference time; and measuring, by the vehicle controller, a cooldown time when the third-stage boost control mode ends.

Other aspects and embodiments of the present disclosure are discussed below.

It should be understood that the term "vehicle" or other similar terms as used herein are inclusive of motor vehicles in general. Such motor vehicles may include sport utility vehicles (SUVs), buses, trucks, various commercial vehicles, and the like. Such motor vehicles may also include watercraft having a variety of boats and ships, aircraft, and the like. Such motor vehicles may also include hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, e.g., a vehicle that is both electric-powered and gasoline-powered.

The above and other features of the present disclosure are discussed below.

BRIEF DESCRIPTION OF THE DRAWINGS

The above and other features of the present disclosure are now described in detail with reference to certain embodiments thereof illustrated in the accompanying drawings which are given herein by way of illustration only, and thus are not limitative of the present disclosure, and wherein.

Reference numerals set forth in the Drawings include reference to the following elements as further discussed below:

It should be understood that the appended drawings are not necessarily drawn to scale, presenting a somewhat simplified representation of various features illustrative of the basic principles of the disclosure. The specific design features of the present disclosure as disclosed herein, including, for example, specific dimensions, orientations, locations, and shapes should be determined in part by the particular intended application and use environment.

In the figures, reference numbers refer to the same or equivalent parts of the present disclosure throughout the several figures of the drawing.

DETAILED DESCRIPTION

Hereinafter, reference should be made in detail to various embodiments of the present disclosure, examples of which are illustrated in the accompanying drawings and described below. While the present disclosure is described in conjunction with the embodiments, it should be understood that present description is not intended to limit the present disclosure to the embodiments. On the contrary, the present disclosure is intended to cover not only the embodiments, but also various alternatives, modifications, equivalents, and other embodiments, within the spirit and scope of the present disclosure as defined by the appended claims.

In this specification, terms such as first and/or second may be used to describe various components, but the components are not limited by the terms. The terms are used only for the purpose of distinguishing one component from other components, for example, without departing from the scope of rights according to the concept of the present disclosure, a first component may be referred to a second component, similarly, the second component may also be referred to as the first component.

When a controller, component, device, element, part, unit, module, or the like of the present disclosure is described as having a purpose or performing an operation, function, or the like, the component, device, or element should be considered herein as being "configured to" meet that purpose or perform that operation or function. Each controller, component, device, element, part, unit, module, and the like may separately embody or be included with a processor and a memory, such as a non-transitory computer readable media, as part of the apparatus.

Hereinafter, the embodiments of the present disclosure are described in detail with reference to the accompanying drawings.

Figure 2:
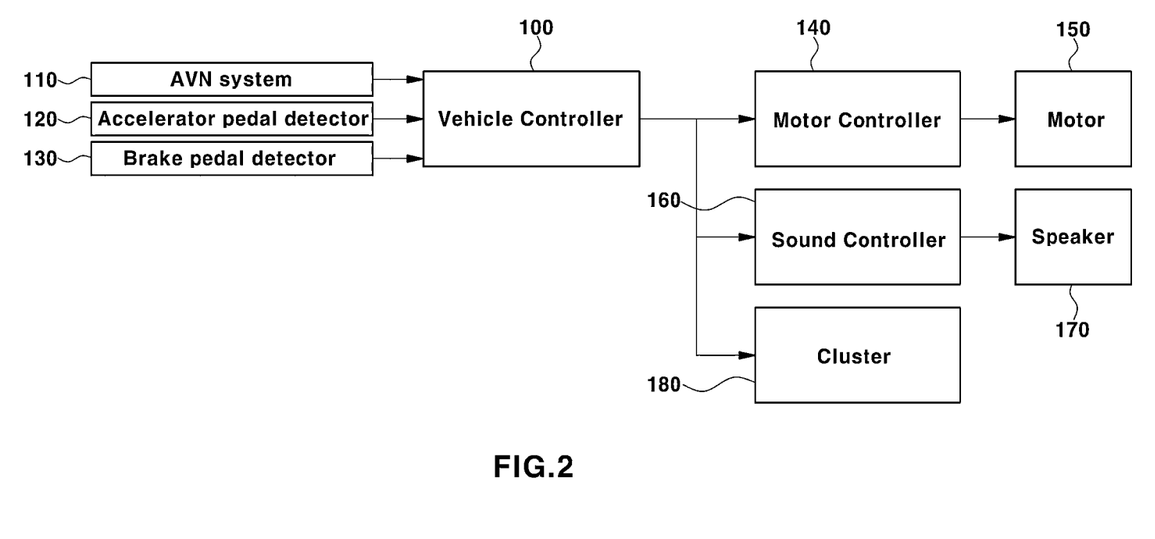
FIG. 2 is a control configuration diagram showing a launch control system for an electric vehicle according to an embodiment of the present disclosure.

FIG. 2 is a control configuration diagram showing a launch control system for an electric vehicle according to an embodiment of the present disclosure.

As shown in FIG. 2, an audio, video, and navigation (AVN) system 110, an accelerator pedal detector 120, a brake pedal detector 130, and the like are connected to an input side of a vehicle controller 100 to enable signal transmission. A motor controller 140 for controlling torque of a motor 150, a sound controller 160 for outputting virtual engine sounds to a speaker 170, a cluster 180, and the like are connected to an output side of the vehicle controller 100.

As is well known, the AVN system 110 refers to a multimedia device in which audio, video, and navigation functions are combined. The AVN system 110 includes a touch-type display 112 for the selection and input of various menus.

The various menus for vehicle operation are displayed on a display 112 of the AVN system 110. Particularly, a road grip level selection menu and a launch control activation selection menu may be displayed on the display 112.

Accordingly, when a driver (e.g., user) touches and selects the road grip level from among the menus displayed on the display 112 of the AVN system 110, a road grip level signal may be transmitted to the vehicle controller 100.

Figure 4:
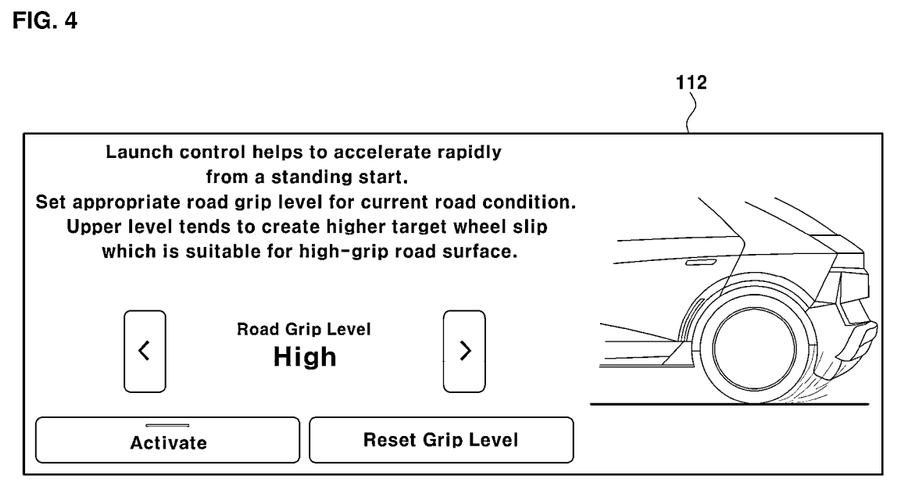
FIG. 4 is a schematic diagram showing an example in which a road grip level is selected through a display of an AVN (Audio, Video, Navigation) system in a launch control method for an electric vehicle according to an embodiment of the present disclosure.

The road grip level is selected to optimize wheel (tire) slip of an electric vehicle with respect to a road surface during driving. Depending on a state of the road surface, the road grip level may be selected as High, as shown in FIG. 4, or may be selected as Medium or Low.

In addition, when the driver touches and selects launch control activation from among the menus displayed on the display 112 of the AVN system 110, a launch control activation signal may be transmitted to the vehicle controller 100.

Unlike an internal combustion engine vehicle, since the electric vehicle does not have any elements that control an engine speed and a clutch, in order to optimize wheel slip of the electric vehicle with respect to a road surface, it is preferable to select the road grip level first according to a state of the road surface before selecting launch control activation.

The accelerator pedal detector 120 may be an accelerator pedal position sensor that transmits a detection signal of the amount of pressing on an accelerator pedal to the vehicle controller 100. The detection signal indicates the amount by which the accelerator pedal is pressed. The brake pedal detector 130 may be a brake pedal position sensor that transmits a detection signal, which corresponds to the depression amount of a brake pedal, to the vehicle controller 100. In other words, this signal indicates the amount by which the brake pedal is pressed.

The vehicle controller 100 is configured to receive a road grip level signal from the AVN system 110, receive a launch control activation signal from the AVN system 110, determine launch control entry when launch control entry conditions are satisfied, and execute a first-stage launch control.

The launch control entry conditions include the following conditions described below.

A current vehicle drive mode may not be a boost mode or a cruise mode.

The temperature of the motor controller 140 may be equal to or less than a certain temperature (e.g., 110° C. in a first motor controller for torque control of a front wheel motor, and 130° C. in a second motor controller for torque control of a rear wheel motor).

The temperature of an IGBT (Insulated Gate Bipolar Transistor) of the motor 150 may be equal to or less than a certain temperature (e.g., 130° C.).

A cooldown time may be longer than a reference time (e.g., 2 minutes). The vehicle controller 100 determines whether all of the above launch control entry conditions are satisfied.

As is well known, the boost mode refers to a mode in which the maximum torque is applied to the wheels of the vehicle according to the maximum torque output of the motor for launching and driving. The cruise mode refers to a mode in which the vehicle travels at a constant speed at a preset speed. The cooldown time refers to a time period measured from the end of a previous launch control.

Determining whether all the above launch control entry conditions are satisfied is desired to know whether the motor performance can be maximized in order to utilize the launch control of the electric vehicle.

In other words, in order to utilize the launch control, it is desired to determine whether the motor controller and the motor are in a state in which the maximum performance can be achieved.

For example, when the current vehicle's drive mode is the boost mode or the cruise mode, the launch control entry conditions are not satisfied since the motor torque is being controlled. Additionally, when the temperature of the motor controller or the IGBT temperature of the motor exceeds a certain temperature, the launch control entry conditions are not satisfied since the motor performance is not maximized due to heat. Further, when the cooldown time is less than the reference time (e.g., 2 minutes), the launch control entry conditions are not satisfied since the temperature of the motor controller or the motor may not fall below a certain temperature.

In this way, the vehicle controller 10 is configured to determine launch control entry and execute the first-stage launch control when all the launch control entry conditions are satisfied.

In a state in which the launch control entry is determined by the vehicle controller 10 and the first-stage launch control is executed, general electric vehicle driving may be performed until second-stage launch control entry conditions are satisfied.

In other words, even when the vehicle controller 10 determines launch control entry, in a state in which the first-stage launch control is being executed by the vehicle controller 10, the user may manipulate the accelerator pedal and the brake pedal to maintain a driving state in the same way as the general electric vehicle drive mode until the second-stage launch control entry conditions are satisfied.

The vehicle controller 100 is configured to determine whether the second-stage launch control entry conditions are satisfied while determining launch control entry and executing the first-stage launch control.

The second-stage launch control entry conditions include the following conditions described below.

A drive mode may be selected as a sport mode or a sport+ mode.

In order to suppress the operation of ESC (Electronic Stability Control), which is a form of vehicle dynamic control, an ESC sport mode may be selected. Alternatively, the ESC may be turned off.

A gear shift may be set to drive "D."

A steering angle of a steering wheel may be less than a certain angle (about 100°).

An accelerator pedal stroke may exceed a certain level (e.g., 95%), and simultaneously, a brake pedal stroke may exceed a certain level (e.g., 40%).

The vehicle controller 100 determines whether all the second-stage launch control entry conditions are satisfied.

Specifically, in order to execute the second-stage launch control in a state in which the first-stage launch control is executed, certain second-stage launch control entry conditions must be met. The second-stage launch control entry conditions may include: i) the driver may change the drive mode to the sport mode or the sport+ mode, ii) the ESC sport mode may be selected or the ESC may be turned off in order to minimize or suppress a control of suppressing spin of the wheels according to on-operation of the ESC, iii) the steering angle of the steering wheel may be set to be below a certain angle in order to perform straight driving in the shift gear D, and iv) the driver may keep pressing the accelerator pedal and the brake pedal at the same time (i.e., simultaneously) until the vehicle actually launches.

The vehicle controller 100 is configured to execute the second-stage launch control of applying pre-motor torque to the motor 150 when all the second-stage launch control entry conditions are satisfied.

In other words, the vehicle controller 100 is configured to control entry into the second-stage launch control for applying the motor torque to the motor 150 in advance when all the second-stage launch control entry conditions are satisfied.

To this end, the vehicle controller 100 is configured to determine the pre-motor torque to be applied to the motor in advance using the following Equation 1 (described below) while pressing the accelerator pedal and the brake pedal at the same time.

$$\text{pre-motor torque} = \max[(\text{motor torque application map (vehicle speed, brake stroke) according to road grip level, motor torque application map (vehicle speed, brake stroke) with accelerator pedal and brake pedal simultaneously pressed}] \quad \text{(Equation 1)}$$

In Equation 1, the motor torque application map (MAP) according to the road grip level is table-type map data preset to use the vehicle speed and the brake stroke as input variables. The motor torque application map (MAP) in the simultaneous pressing state of the accelerator pedal and the brake pedal is table-type map data preset to use the vehicle speed and the brake stroke as input variables.

Accordingly, the vehicle controller 100 determines a larger torque value among a motor torque determined from the motor torque application map according to the road grip level and a motor torque determined from the motor torque application map in the simultaneous pressing state of the accelerator pedal and the brake pedal, as the pre-motor torque to be applied to the motor in advance.

Accordingly, the vehicle controller 100 determines the pre-motor torque to be applied to the motor in advance and then transmits the pre-motor torque value to the motor controller 140. As a result, the pre-motor torque can be applied to the motor 150 by the torque control of the motor controller 140.

In this way, by executing the second-stage launch control by the vehicle controller 100, the pre-motor torque may be applied to the motor 150 in a state in which the accelerator pedal and the brake pedal are pressed at the same time.

Figure 6:
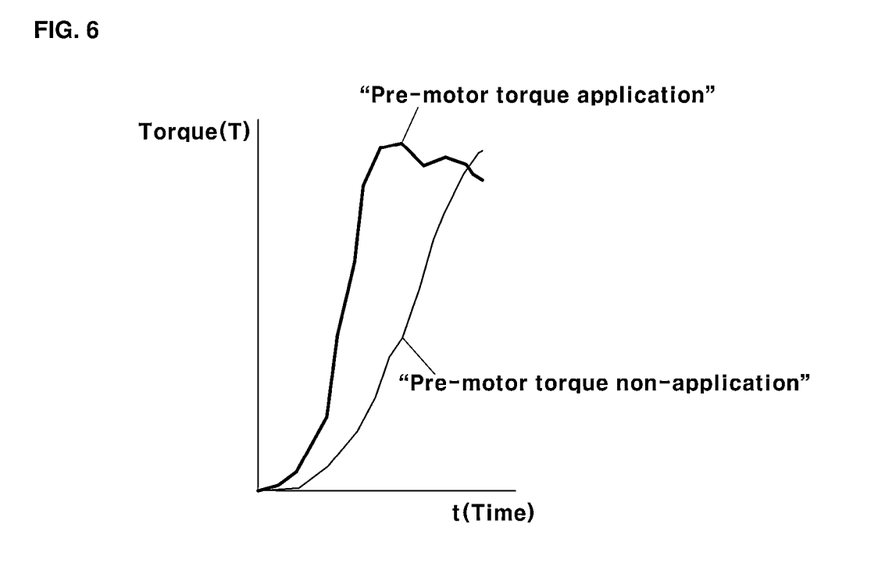
FIG. 6 is a graph showing a pre-motor torque application step for applying torque to a motor in advance in a launch control method for an electric vehicle according to an embodiment of the present disclosure.

Referring to FIG. 6, the motor torque may increase when the pre-motor torque is applied compared with a case where the pre-motor torque is not applied (for example, in the case of the motor torque applied during normal driving). Accordingly, by applying torque to the motor and wheels in advance under the condition that the accelerator pedal and the brake pedal are pressed at the same time, it is possible to minimize an initial launch response of the vehicle.

In addition, since the pre-motor torque enables rapid initial acceleration build-up of the electric vehicle, it is possible to shorten the time for the electric vehicle to start launching after releasing the brake pedal.

Figure 7:
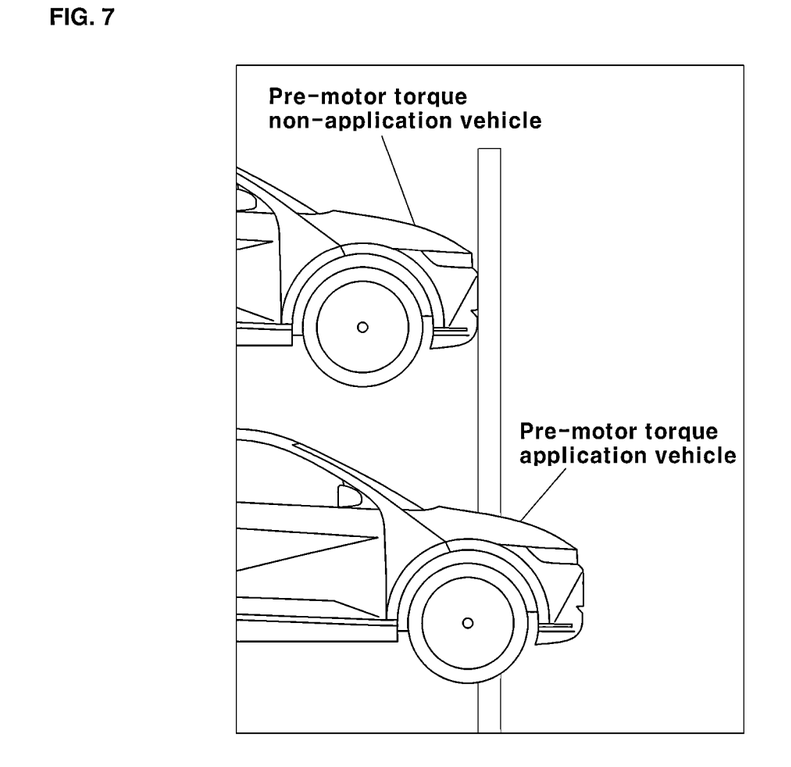
FIG. 7 is a schematic diagram showing a state in which a launch of an electric vehicle is performed faster than a vehicle without pre-motor torque by a pre-motor torque application step in a launch control method for an electric vehicle according to an embodiment of the present disclosure.

For example, referring to FIG. 7, in the case of an electric vehicle to which the pre-motor torque is applied, the initial launch after releasing the brake pedal may proceed faster than an electric vehicle to which the pre-motor torque is not applied.

When the vehicle controller 100 transmits launch control state information such as execution of the second-stage launch control to the cluster 180, the cluster 180 displays guidance information for executing the launch control.

Figure 5:
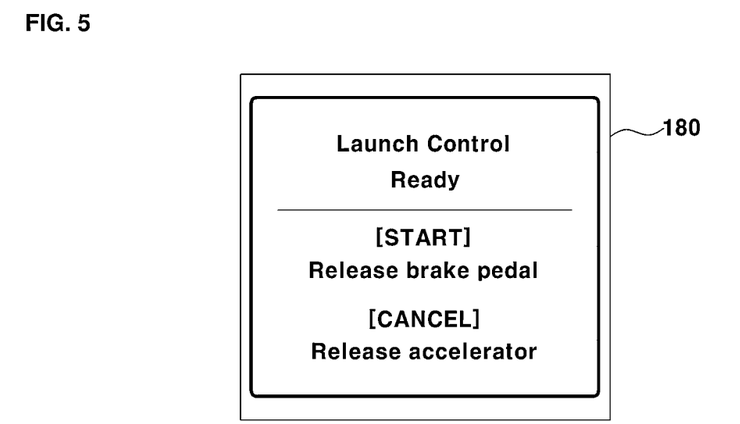
FIG. 5 is a schematic diagram showing an example in which a launch control execution step is guided through a cluster in a launch control method for an electric vehicle according to an embodiment of the present disclosure.

For example, in a case where the pre-motor torque is applied to the motor 150 under the condition that the accelerator pedal and the brake pedal are pressed at the same time, as shown in FIG. 5, if the brake pedal is released (the driver takes one's foot off the brake pedal), information informing the driver that the electric vehicle can start launching may be displayed as a pop-up on the cluster 180, and if the accelerator pedal is released (the driver takes one's foot off the accelerator pedal), information informing the driver that the launch control can be released may be displayed as a pop-up on the cluster 180.

In addition, the vehicle controller 100 is configured to determine a virtual engine speed when executing the second-stage launch control for applying the pre-motor torque to the motor 150. The vehicle controller 100 is also configured to transmit the determined virtual engine speed to the sound controller 160.

In other words, in order to provide the driver with an experience similar to hearing an engine sound when an internal combustion engine vehicle launches, the vehicle controller 100 determines the virtual engine speed using the following Equation 2 (described below), and transmits the determined virtual engine speed to the sound controller 160.

$$\text{virtual engine speed} = \text{launch control set speed} \pm \text{offset} \quad \text{(Equation 2)}$$

In Equation 2, the + and − signs of the offset change at a predetermined interval while executing the second-stage launch control.

Figure 8:
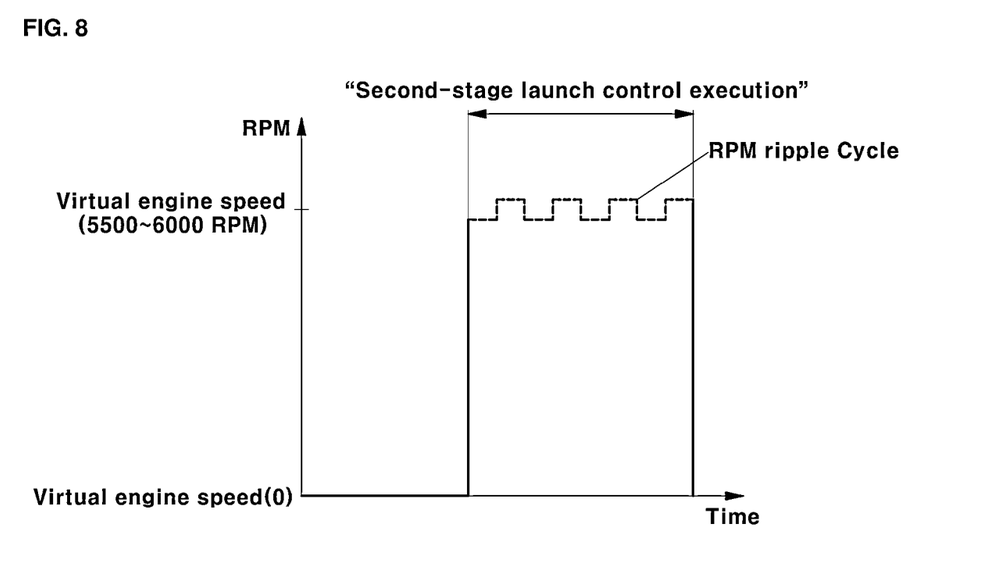
FIG. 8 is a graph showing an example in which a virtual engine speed is generated when torque is applied in advance to a motor in a launch control method for an electric vehicle according to an embodiment of the present disclosure.

For example, when executing the second-stage launch control for applying the pre-motor torque, the vehicle controller 100 determines the virtual engine speed to be 5,500 to 6,000 revolutions per minute (RPM) according to the launch control setting speed, as shown in FIG. 8, with a ripple cycle according to the sign change of the offset.

Accordingly, the sound controller 160 determines a virtual engine sound volume according to the virtual engine speed and outputs the determined virtual engine sound volume through the speaker 170. As a result, the driver can have an emotional experience similar to hearing the engine driving sound when the driver depresses the accelerator pedal right before the internal combustion engine vehicle launches.

When executing the second-stage launch control for applying the pre-motor torque, the vehicle controller 100 is configured to perform control for executing the first-stage launch control again when any of the second-stage launch control entry conditions are not satisfied.

Further, the vehicle controller 100 is configured to forcibly release the second-stage launch control, when the time to execute the second-stage launch control for applying the pre-motor torque exceeds a reference time (e.g., about 8 seconds), considering that the temperature of the motor 150 may increase excessively.

The vehicle controller 100 is configured to execute a third-stage boost control mode when confirmation is made that the brake pedal is released within the reference time while the second-stage launch control for applying the pre-motor torque is being executed.

The boost control mode refers to a drive mode for launch in which the maximum torque is applied to the wheels in a state in which the brake pedal is released and the accelerator pedal stroke exceeds a certain level (e.g., 95%) in order to maximize the driving performance from 0 to 100 kph.

Specifically, the boost control mode may be forcibly activated without separate driver manipulation, and can apply the maximum torque to the motor for launching the vehicle in order to maximize drag racing performance.

For example, when it is confirmed that the brake pedal is released within the reference time when the vehicle controller 100 executes the second-stage launch control for applying the pre-motor torque, the boost control mode may include a step of transmitting a motor maximum torque command value to the motor controller 140. The boost control mode may also include a step of driving the motor 150 at the maximum torque for a certain period of time by torque control according to the motor maximum torque command value of the motor controller 140, and a step of applying the maximum torque to the wheels as the motor 150 is driving at the maximum torque.

The vehicle controller 100 is configured to measure the cooldown time (time measured from the end of the previous launch control execution) when the third-stage boost control mode ends.

A launch control method in the launch control system for the electric vehicle according to the embodiment of the present disclosure, having the above-described configuration, is described as follows.

Figure 3:
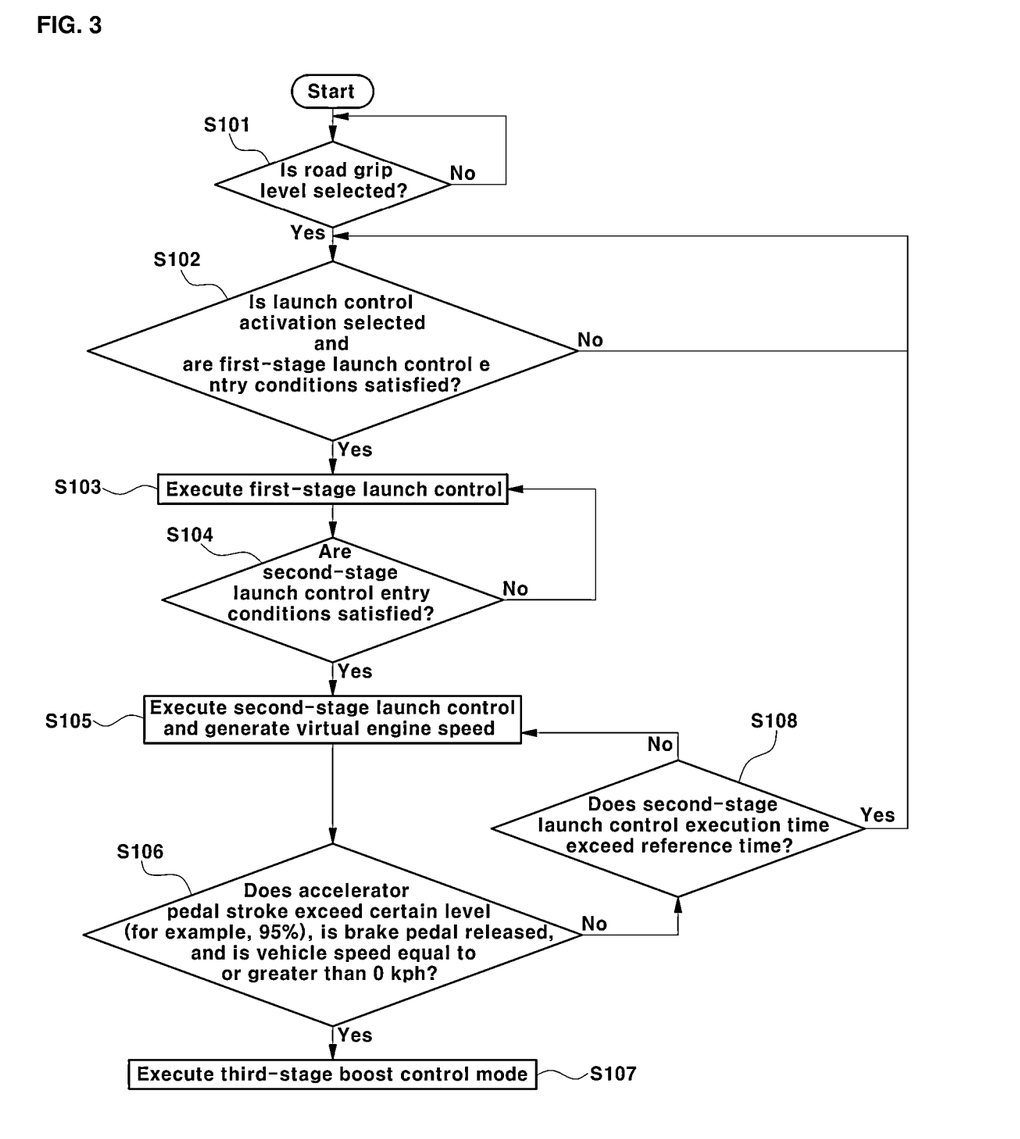
FIG. 3 is a flowchart showing a launch control method for an electric vehicle according to an embodiment of the present disclosure.

FIG. 3 is a flowchart showing a launch control method for an electric vehicle according to an embodiment of the present disclosure.

First, it is determined whether a driver has selected the road grip level (S101).

The road grip level is selected to optimize wheel (tire) slip of an electric vehicle with respect to a road surface during driving. Depending on a state of the road surface, the road grip level may be selected as High, as shown in FIG. 4, or may be selected as Medium or Low.

Accordingly, when the driver touches and selects the road grip level from among the menus displayed on the display 112 of the AVN system 110, the selected road grip level signal may be transmitted to the vehicle controller 100.

Then, it is determined whether the driver has selected launch control activation and whether the launch control entry conditions are satisfied (S102).

When the driver touches and selects launch control activation from the menus displayed on the display of the AVN system 110, a launch control activation signal may be transmitted to the vehicle controller 100. Accordingly, the vehicle controller 100 may recognize that the launch control activation is selected.

In addition, the vehicle controller 100 determines whether all the launch control entry conditions including the following conditions: 1) the current vehicle drive mode may not be the boost mode or the cruise mode; 2) the temperature of the motor controller may be equal to or less than a certain temperature (e.g., 110° C. in the first motor controller for torque control of the front wheel motor, and 130° C. in the second motor controller for torque control of the rear wheel motor); 3) the temperature of the IGBT (Insulated Gate bi-polar Transistor) of the motor may be equal to or less than a certain temperature (e.g., 130° C.); and 4) the cooldown time may be longer than the reference time (e.g., 2 minutes), are satisfied.

Then, when the launch control activation is selected and all of the above launch control entry conditions are satisfied, launch control entry is determined by the vehicle controller 100 and the first-stage launch control is executed (S103).

In a state in which the launch control entry is determined by the vehicle controller 100 and the first stage launch control is executed, general electric vehicle driving may be performed until second-stage launch control entry conditions are satisfied.

Then, the vehicle controller 100 determines whether the second-stage launch control entry conditions are satisfied (S104).

As described above, the second-stage launch control entry conditions include the following conditions: 1) the drive mode may be selected as the sport mode or the sport+ mode; 2) in order to suppress operation of ESC (Electronic Stability Control), the ESC sport mode may be selected, or the ESC may be turned off; 3) the gear shift may be set to drive (D); 4) the steering angle of the steering wheel may be less than a certain angle (approximately) 100°; and 5) the accelerator pedal stroke may exceed a certain level (e.g., 95%), and simultaneously, the brake pedal stroke may exceed a certain level (e.g., 40%). The vehicle controller 100 determines whether all the second-stage launch control entry conditions are satisfied.

Then, when all of the second-stage launch control entry conditions are satisfied, the second-stage launch control of applying pre-motor torque to the motor 150 is executed by the vehicle controller 100 and a virtual engine speed is created (S105).

To this end, the vehicle controller 100 determines the pre-motor torque to be applied to the motor 150 in advance using Equation 1 in a state in which the accelerator pedal and the brake pedal are pressed at the same time.

Specifically, the vehicle controller 100 determines, as the pre-motor torque to be applied to the motor 150 in advance, a larger torque value among a motor torque determined from the motor torque application map according to the road grip level and a motor torque determined from the motor torque application map in a state in which the accelerator pedal and brake pedal are pressed at the same time.

Accordingly, the vehicle controller 100 determines the pre-motor torque to be applied to the motor in advance and then transmits a pre-motor torque value to the motor controller 140. As a result, the pre-motor torque may be applied to the motor 150 by torque control of the motor controller 140 in a state in which the accelerator pedal and the brake pedal are pressed at the same time.

Accordingly, as shown in FIG. 6, the motor torque may increase when the pre-motor torque is applied compared with a case where the pre-motor torque is not applied (e.g., when the motor torque is applied during normal driving). Additionally, since the pre-motor torque is applied to the motor and the wheels in advance under the condition that the accelerator pedal and the brake pedal are pressed at the same time, it is possible to minimize an initial launch response of the vehicle. Further, since the pre-motor torque enables rapid initial acceleration build-up of the electric vehicle, it is possible to shorten the time for the electric vehicle to start launching after releasing the brake pedal.

The vehicle controller 100 executes the second-stage launch control for applying the pre-motor torque to the motor 150, determines the virtual engine speed, and transmits the determined virtual engine speed to the sound controller 160.

In other words, in order to provide the driver with an experience similar to hearing an engine sound when an internal combustion engine vehicle launches, the vehicle controller 100 determines the virtual engine speed using Equation 2, and transmits the determined virtual engine speed to the sound controller 160.

Accordingly, the sound controller 160 determines a virtual engine sound volume according to the virtual engine speed and outputs the determined virtual engine sound volume through the speaker 170. As a result, the driver can have an emotional experience similar to hearing the engine driving sound when the driver depresses the accelerator pedal right before the internal combustion engine vehicle launches. Thus, it is possible to satisfy a driver's needs for a high-performance vehicle.

Then, the vehicle controller 100 determines whether the brake pedal is released and the accelerator pedal stroke exceeds a certain level (e.g., 95%), at the vehicle speed of 0 kph (S106).

As a result of the determination that the brake pedal is released and the accelerator pedal stroke exceeds the certain level (e.g., 95%), the third-stage boost control mode is executed to apply the maximum torque to the wheels by the vehicle controller 100 (S107).

The boost control mode, which is executed in a state in which the brake pedal is released and the accelerator pedal stroke exceeds a certain level (e.g., 95%), may be forcibly activated without separate driver manipulation to maximize the driving performance from 0 to 100 kph. Additionally, the boost control mode may apply the maximum torque to the motor to maximize the drag race performance for launching the vehicle.

For example, when it is confirmed that the brake pedal is released within the reference time when the vehicle controller 100 executes the second-stage launch control for applying the pre-motor torque, the boost control mode may include a step of transmitting a motor maximum torque command value to the motor controller 140. The boost motor control mode may also include a step of driving the motor 150 at the maximum torque for a certain period of time by torque control according to the motor maximum torque command value of the motor controller 140, and a step of applying the maximum torque to the wheels as the motor 150 is driving at the maximum torque.

The vehicle controller 100 determines whether the time to execute the second-stage launch control for applying the pre-motor torque exceeds a reference time (e.g., near 8 seconds) (S108). When it is confirmed that the time for executing the second-stage launch control for applying the pre-motor torque exceeds the reference time (S108), the launch control is forcibly released considering that the temperature of the motor may rise excessively.

In this way, when it is confirmed that the brake pedal is released within the reference time when executing the second-stage launch control for applying the pre-motor torque, the third-stage boost control mode is executed by the vehicle controller 100 to apply the maximum torque to the wheels.

Accordingly, the present disclosure provides the following effects.

First, by maximizing acceleration at an initial stage of launching an electric vehicle from a standstill, it is possible to realize a high performance of the electric vehicle.

Second, by shortening the time to reach the maximum acceleration when launching the electric vehicle from a standstill and maximizing the acceleration, it is possible to satisfy a driver's needs for a high-performance vehicle.

Third, it is possible to minimize response at the initial launch of the electric vehicle by applying torque to the motor in advance under the condition that the brake pedal and the accelerator pedal are pressed at the same time before the actual launch of the electric vehicle. As a result, it is possible to shorten the time for the electric vehicle to start launching after releasing the brake pedal due to rapid initial acceleration build-up of the electric vehicle, thereby satisfying driver's needs for a high-performance vehicle.

Fourth, when the torque is applied to the motor in advance under the condition that the brake pedal and accelerator pedal are pressed at the same time before the actual start of the electric vehicle, since the sound controller outputs engine sound based on a virtual engine speed signal and sound volume signal, it is possible to satisfy a driver's demand for a high-performance vehicle.

The present disclosure has been described in detail with reference to embodiments thereof. However, it should be appreciated by those having ordinary skill in the art that changes may be made in these embodiments without departing from the principles and spirit of the present disclosure, the scope of which is defined in the appended claims and their equivalents.

What is claimed is:

1. A launch control system for an electric vehicle, the launch control system comprising:
    an audio, video, and navigation (AVN) system configured to select a road grip level and launch control activation;
    an accelerator pedal detector configured to detect a depression amount of an accelerator pedal;
    a brake pedal detector configured to detect a depression amount of a brake pedal; and
    a vehicle controller,
    wherein based on a launch control activation signal from the AVN system, a detection signal of the accelerator pedal detector, and a detection signal of the brake pedal detector, the vehicle controller is configured to execute:
    a first-stage launch control when first-stage launch control entry conditions are satisfied,
    a second-stage launch control of applying pre-motor torque to a motor when second-stage launch control conditions are satisfied in a state in which the first-stage launch control is executed, and
    a third-stage boost control mode when the brake pedal is released in a state in which the second-stage launch control is executed.

2. The launch control system according to claim 1, wherein the vehicle controller is further configured to execute the first-stage launch control when all the first-stage launch control entry conditions are satisfied, and
    wherein the first-stage launch control entry conditions include: i) a current drive mode of a vehicle is not in a boost mode or a cruise mode, ii) a temperature of a motor controller is equal to or less than a certain temperature, iii) a temperature of an insulated gate bipolar transistor (IGBT) of the motor is equal to or less than a certain temperature, and iv) a cooldown time is longer than a reference time.

3. The launch control system according to claim 1, wherein the vehicle controller is further configured to execute the second-stage launch control when all second-stage launch control entry conditions are satisfied, and
    wherein the second-stage launch control entry conditions include: i) a drive mode is selected as a sport mode or a sport+ mode, ii) electronic stability control (ESC) is turned off, iii) a gear shift is set to drive (D), iv) a steering angle of a steering wheel is less than a certain angle, and v) an accelerator pedal stroke exceeds a certain level, and at the same time, a brake pedal stroke exceeds a certain level.

4. The launch control system according to claim 1, wherein the vehicle controller is further configured to determine, as the pre-motor torque is applied to the motor in advance, a larger torque value among a motor torque determined from a motor torque application map according to the road grip level and a motor torque determined from a motor torque application map where the accelerator pedal and the brake pedal are pressed at the same time.

5. The launch control system according to claim 4, wherein when the pre-motor torque determined by the vehicle controller is transmitted to a motor controller, the pre-motor torque is applied to the motor by torque control of the motor controller.

6. The launch control system according to claim 1, further comprising:
    a cluster configured to display guidance information for launch control execution based on launch control state information received from the vehicle controller.

7. The launch control system according to claim 1, wherein the vehicle controller is further configured to determine a virtual engine speed when executing the second-stage launch control and transmit the determined virtual engine speed to a sound controller.

8. The launch control system according to claim 7, wherein the sound controller is configured to determine a virtual engine sound volume according to the virtual engine speed and output the determined virtual engine sound volume through a speaker.

9. The launch control system according to claim 1, wherein the vehicle controller is further configured to perform control for executing the first-stage launch control again when second-stage launch control entry conditions are not satisfied when the second-stage launch control for applying the pre-motor torque is executed.

10. The launch control system according to claim 1, wherein the vehicle controller is further configured to forcibly release the second-stage launch control when a time for executing the second-stage launch control for applying the pre-motor torque exceeds a reference time.

11. The launch control system according to claim 1, wherein the vehicle controller is further configured to execute a third-stage boost control mode when confirmation is made that the brake pedal is released within a reference time when the second-stage launch control for applying the pre-motor torque is executed.

12. The launch control system according to claim 11, wherein the vehicle controller is further configured to measure a cooldown time when the third-stage boost control mode ends.

13. A launch control method for an electric vehicle, the launch control method comprising:
   determining, by a vehicle controller, whether a road grip level is selected;
   determining, by the vehicle controller, whether launch control activation is selected and whether first-stage launch control entry conditions are satisfied;
   executing, by the vehicle controller, a first-stage launch control when the road grip level and the launch control activation are selected and the first-stage launch control entry conditions are satisfied;
   executing, by the vehicle controller, a second-stage launch control for applying pre-motor torque to a motor of the electric vehicle when second-stage launch control entry conditions are satisfied and when the first-stage launch control is executed; and
   executing, by the vehicle controller, a third-stage boost control mode when a brake pedal is released and the second-stage launch control is executed.

14. The launch control method according to claim 13, wherein the first-stage launch control is executed by the vehicle controller, when all the first-stage launch control entry conditions are satisfied, and
   wherein the first-stage launch control entry conditions include: i) a current drive mode of a vehicle is not in a boost mode or a cruise mode, ii) a temperature of a motor controller is equal to or less than a certain temperature, iii) a temperature of an insulated gate bipolar transistor (IGBT) of the motor is equal to or less than a certain temperature, and iv) a cooldown time is longer than a reference time.

15. The launch control method according to claim 13, wherein the second-stage launch control is executed by the vehicle controller when all the second-stage launch control entry conditions are satisfied, and
   wherein the second-stage launch control entry conditions include: i) a drive mode is selected as a sport mode or a sport+ mode, ii) electronic stability control (ESC) is turned off, iii) a gear shift is set to drive (D), iv) a steering angle of a steering wheel is less than a certain angle, and v) an accelerator pedal stroke exceeds a certain level, and at the same time a brake pedal stroke exceeds a certain level.

16. The launch control method according to claim 13, wherein executing the second-stage launch control comprises:
   determining, by the vehicle controller, as the pre-motor torque, a larger torque value among a motor torque determined from a motor torque application map according to the road grip level and a motor torque determined from a motor torque application map where an accelerator pedal and the brake pedal are pressed at the same time;
   transmitting, by the vehicle controller, the determined pre-motor torque to a motor controller; and
   applying, by torque control of the motor controller, the pre-motor torque to the motor.

17. The launch control method according to claim 13, further comprising:
   displaying, by a cluster, guidance information for executing launch control based on launch control state information received from the vehicle controller.

18. The launch control method according to claim 13, further comprising:
   determining, by the vehicle controller, a virtual engine speed when the second-stage launch control is executed;
   transmitting, by the vehicle controller, the virtual engine speed to a sound controller;
   determining, by the sound controller, a virtual engine sound volume according to the virtual engine speed; and
   outputting, by a speaker, the determined virtual engine sound volume.

19. The launch control method according to claim 13, wherein the third-stage boost control mode is executed when confirmation is made that the brake pedal is released within a reference time and the second-stage launch control for applying the pre-motor torque is executed.

20. The launch control method according to claim 13, further comprising:
   performing, by the vehicle controller, a control for executing the first-stage launch control again when any of the second-stage launch control entry conditions are not satisfied when the second-stage launch control for applying the pre-motor torque is executed;
   forcibly releasing, by the vehicle controller, the second-stage launch control when a time for executing the second-stage launch control for applying the pre-motor torque exceeds a reference time; and
   measuring, by the vehicle controller, a cooldown time when the third-stage boost control mode ends.

* * * * *